(12) United States Patent
Lin et al.

(10) Patent No.: US 11,115,606 B2
(45) Date of Patent: Sep. 7, 2021

(54) MOTHERBOARD AND OPERATING SYSTEM CAPABLE OF OUTPUTTING IMAGE DATA

(71) Applicant: GIGA-BYTE TECHNOLOGY CO., LTD., New Taipei (TW)

(72) Inventors: Yin-Yu Lin, New Taipei (TW); Chia-En Liu, New Taipei (TW); Chun-Chung Huang, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/887,380

(22) Filed: May 29, 2020

(65) Prior Publication Data
US 2020/0382722 A1 Dec. 3, 2020

(30) Foreign Application Priority Data
May 31, 2019 (TW) .................. 108118859

(51) Int. Cl.
*H04N 5/268* (2006.01)
*G06T 1/20* (2006.01)
(Continued)

(52) U.S. Cl.
CPC .............. *H04N 5/268* (2013.01); *G06T 1/20* (2013.01); *H04N 5/63* (2013.01); *H04N 21/426* (2013.01)

(58) Field of Classification Search
CPC ...... G06F 3/1415; G06F 3/1431; H04N 5/268
See application file for complete search history.

(56) References Cited

U.S. PATENT DOCUMENTS 6,803,912 B1 * 10/2004 Mark .................. H04N 13/398
  345/427
7,633,560 B1 * 12/2009 Sivertsen ............... H04N 9/641
  348/180
(Continued)

FOREIGN PATENT DOCUMENTS

CN  202584680 U  12/2012
CN  207117842 U   3/2018
(Continued)

OTHER PUBLICATIONS

Partial European Search Report, dated Aug. 13, 2020, for European Application No. 20175778.8.
(Continued)

*Primary Examiner* — Paulos M Natnael
(74) *Attorney, Agent, or Firm* — Birch, Stewart, Kolasch & Birch LLP (57) ABSTRACT

A motherboard is capable of outputting image data and includes an image transmission port, an on-board video graphics array (VGA) card, a switching circuit, a control circuit, and a first network connection port. The image transmission port is configured to receive an external image signal. The on-board VGA card is configured to provide an internal image signal. The switching circuit selectively uses the external image signal or the internal image signal as image data. The control circuit selectively uses the image data or Ethernet network data as output data. The first network connection port is configured to transmit the output data.

20 Claims, 6 Drawing Sheets

(51) Int. Cl.
*H04N 21/426* (2011.01)
*H04N 5/63* (2006.01)

(56) References Cited

U.S. PATENT DOCUMENTS

| | | | | | |
|---|---|---|---|---|---|
| 7,899,864 | B2* | 3/2011 | Margulis | ............... | G06F 3/1462 |
| | | | | | 709/204 |
| 2003/0112483 | A1* | 6/2003 | Takano | ................ | H04N 1/4074 |
| | | | | | 358/521 |
| 2008/0136828 | A1* | 6/2008 | Chang | ................... | G06F 3/1431 |
| | | | | | 345/520 |
| 2008/0285576 | A1 | 11/2008 | Teener et al. | | |
| 2013/0009969 | A1* | 1/2013 | Goldberg | ............... | G09G 5/006 |
| | | | | | 345/520 |
| 2017/0148416 | A1 | 5/2017 | Lee et al. | | |

FOREIGN PATENT DOCUMENTS

| | | |
|---|---|---|
| CN | 207218942 U | 4/2018 |
| CN | 108206921 A | 6/2018 |
| KR | 20-2010-0001532 U | 2/2010 |
| TW | 201224744 A1 | 6/2012 |
| TW | I561073 B | 12/2016 |
| TW | M577136 U | 4/2019 |

OTHER PUBLICATIONS

Taiwanese Office Action and Search Report, dated Jun. 20. 2020, for Taiwanese Application No. 108118859.
Extended European Search Report for European Application No. 20175778.8, dated Nov. 10, 2020.

* cited by examiner

MOTHERBOARD AND OPERATING SYSTEM CAPABLE OF OUTPUTTING IMAGE DATA

CROSS REFERENCE TO RELATED APPLICATIONS

This application claims priority of Taiwan Patent Application No. 108118859, filed on May 31, 2019, the entirety of which is incorporated by reference herein.

BACKGROUND OF THE INVENTION

Field of the Invention

The invention relates to a motherboard, and more particularly to a motherboard that utilizes a network transmission port to output image data.

Description of the Related Art

Most of the connection between the current computer host and the monitor uses a video graphics array (VGA) cable. In recent years, due to the advancement of imaging technology, the resolution of image signals is increased. However, the conventional image interface cannot supply the transmission bandwidth of the high-resolution image signals.

In general, most of the electronic devices has an interface which matches a high-definition multimedia interface (HDMI) standard to transmit the high-resolution image signals. When the distance between an image player (e.g., a monitor or a projector) and a computer is far, the user generally uses a long HDMI transmission cable to connect the image player and the computer. It is difficult to manufacture long HDMI transmission cables. Therefore, the price of the cable increases as the length of the cable increases. For the user, the price of the cable is a huge burden.

BRIEF SUMMARY OF THE INVENTION

In accordance with an embodiment of a motherboard is capable of outputting image data and comprises an image transmission port, an on-board video graphics array (VGA) card, a switching circuit, a control circuit, and a first network connection port. The image transmission port is configured to receive an external image signal. The on-board VGA card is configured to provide an internal image signal. The switching circuit selectively uses the external image signal or the internal image signal as image data. The control circuit selectively uses the image data or Ethernet network data as output data. The first network connection port is configured to transmit the output data.

In accordance with another embodiment of the disclosure, a motherboard is capable of outputting image data and comprises an image transmission port, a control circuit, and a first network connection port. The image transmission port is configured to receive an external image signal. The control circuit selectively uses the external image signal or an Ethernet network signal as an output signal. The first network connection port is configured to transmit the output signal.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

Figure 1:
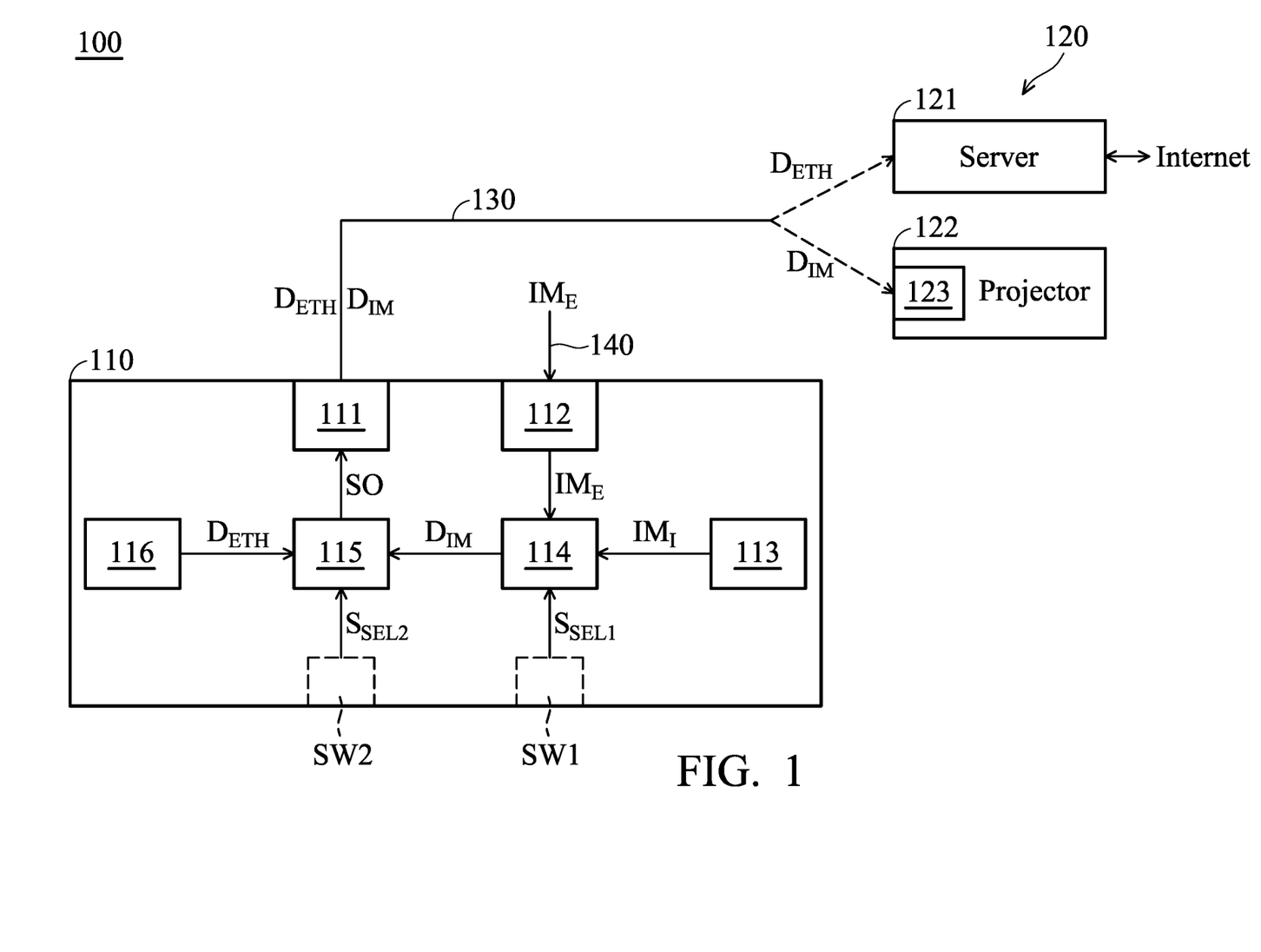
FIG. 1 is a schematic diagram of an exemplary embodiment of an operating system, according to various aspects of the present disclosure.

FIG. 1 is a schematic diagram of an exemplary embodiment of an operating system, according to various aspects of the present disclosure. The operating system 100 comprises a motherboard 110 and an electronic device 120. The motherboard 110 is capable of outputting image data and comprises at least one network connection port 111. The network connection port 111 is configured to output Ethernet network data $D_{ETH}$ or image data D. In this embodiment, the Ethernet network data $D_{ETH}$ and the image data $D_{IM}$ match the same data format, such as a network transmission format. Therefore, the network connection port 111 can not only output the Ethernet network data $D_{ETH}$ but also output the image data $D_{IM}$. For example, when the motherboard 110 operates in a first mode, the network connection port 111 outputs the Ethernet network data $D_{ETH}$. When the motherboard 110 operates in a second mode, the network connection port 111 outputs the image data D.

In one embodiment, the network connection port 111 is a RJ45 connector. The number of the network connection port is not limited in the present disclosure. In other embodiments, the motherboard 110 may be comprise two network connection ports. One of the network connection ports is configured to transmit the Ethernet network data $D_{ETH}$, and the other is configured to transmit the image data $D_{IM}$. In this case, the data format of the image data $D_{IM}$ is the same as the data format of the Ethernet network data $D_{ETH}$.

In this embodiment, the network cable 130 is coupled between the network connection port 111 and the electronic device 120 to transmit the image data $D_{IM}$ or the Ethernet network data $D_{ETH}$ to the electronic device 120. Since the user can utilize the network cable 130 to transmit the image data $D_{IM}$ and the Ethernet network data $D_{ETH}$, the user does not need to buy an additional image transmission cable. Furthermore, since the price of the image transmission cable is increased with increase of the length of the cable, when the distance between the motherboard 110 and the electronic device 120 is large, the user can utilize the low-cost network cable to connect the motherboard 110 and the electronic device 120. Therefore, the cost of the operating system is reduced. Additionally, when the motherboard 110 utilizes a single connection port (e.g., 11) to transmit the image data $D_{IM}$ and the Ethernet network data $D_{ETH}$, the number of the connection port can be reduced.

The electronic device 120 operates according to the image data $D_{IM}$ or the Ethernet network data $D_{ETH}$. The kind of the electronic device 120 is not limited in the present disclosure. In one embodiment, the electronic device 120 is a server 121. In this case, when the server 121 receives the Ethernet network data $D_{ETH}$ via the network cable 130, the server 121 transmits data between the motherboard 110 and an Internet according to the Ethernet network data $D_{ETH}$.

In another embodiment, the electronic device 120 is a display device, such as a projector 122. In this case, when the projector 122 receives the image data $D_{IM}$ via the network cable 130, the projector 122 projects an image according to the image data $D_{IM}$. In this embodiment, the projector 122 comprises a receiver 123. The receiver 123 receives the image data $D_{IM}$. The receiver 123 transforms the image data $D_{IM}$ from a network transmission format into an image transmission format and then provides the transformed result matching the image transmission format to the projector 122. In one embodiment, the image format matches a high-definition multimedia interface (HDMI) standard. In other embodiments, the image format matches a digital visual interface (DVI) standard.

The location of the receiver 123 is not limited in the present disclosure. In this embodiment, the receiver 123 is integrated into the projector 122. In other embodiments, the receiver 123 may independently locate outside of the projector 122. In this case, the receiver 123 transforms the format of the image data $D_{IM}$ and then provides the transformed image data to the projector 122 via an image transmission cable (not shown).

In this embodiment, the motherboard 110 further comprises an image transmission port 112, an on-board video graphics array (VGA) card 113, a switching circuit 114, a control circuit 115 and a network chip 116, but the disclosure is not limited thereto. In other embodiments, the motherboard 110 further comprises various memories, micro-processors (e.g., CPUs), micro-controller. For brevity, FIG. 1 presents a simplified block diagram, in which only the elements and circuits relevant to the invention are shown. In some embodiment, the motherboard 110 is disposed in a case (not shown). In this case, a portion of the network connection port 111 and a portion of the image transmission port 112 are exposed outside of the case such that the user inserts the network cable 130 and the transmission cable 140 into the network connection port 111 and the image transmission port 112.

The image transmission port 112 receives an external image signal $IM_E$ via the transmission cable 140. In other embodiments, the image transmission port 112 utilizes a wireless method to receive the external image signal $IM_E$. The kind of image transmission port 112 is not limited in the present disclosure. In one embodiment, the image transmission port 112 is a HDMI port. In another embodiment, the image transmission port 112 is a DVI port.

The source of the external image signal $IM_E$ is not limited in the present disclosure. In one embodiment, the external image signal $IM_E$ is provided by an electronic device (not shown), such as a mobile phone, a game console or other devices which can output image. In other embodiments, the external image signal $IM_E$ is provided by a VGA card (not shown) disposed in another motherboard. The number of the image transmission port is not limited in the present disclosure. In some embodiments, the motherboard 110 may comprise more or fewer image transmission ports to receive different external image signals.

The on-board VGA card 113 is configured to provide an internal image signal $IM_I$. In one embodiment, the on-board VGA card 113 builds in the motherboard 110, but the disclosure is not limited thereto. In other embodiments, the motherboard 110 does not comprise the on-board VGA card 113.

The switching circuit 114 selectively uses the external image signal $IM_E$ or the internal image signal $IM_I$ as the image data $D_{IM}$. In this embodiment, the switching circuit 114 selectively outputs the external image signal $IM_E$ or the internal image signal $IM_I$ according to a selection signal $S_{SEL1}$. For example, when the selection signal $S_{SEL1}$ is at a first level (e.g., a high level), the switching circuit 114 serves the external image signal $IM_E$ as the image data $D_{IM}$ and provides the external image signal $IM_E$ to the control circuit 115. When the selection signal $S_{SEL1}$ is at a second level (e.g., a low level), the switching circuit 114 uses the internal image signal $IM_I$ as the image data $D_{IM}$ and provides the internal image signal $IM_I$ to the control circuit 115. In other embodiments, when the motherboard 110 comprises more image transmission ports, the switching circuit 114 selects one image signal from various image signals according to the selection signal $S_{SEL1}$.

In one embodiment, the selection signal $S_{SEL1}$ is provided by a switch SW1. In this case, the user switches the switch SW1 to select the source of the image data. For example, the image data may be provided from the image transmission port 112 or the on-board VGA card 113. In one embodiment, the switch SW1 is disposed outside of the case for users to switch. In other embodiments, when the motherboard 110 does not comprise the on-board VGA card 113, the switching circuit 114 can be omitted. In this case, the external image signal $IM_E$ is directly served as the image data $D_{IM}$.

The control circuit 115 selectively uses the image data $D_{IM}$ or the Ethernet network data $D_{ETH}$ as output data SO. In this embodiment, the control circuit 115 selects the image data $D_{IM}$ or the Ethernet network data $D_{ETH}$ according to a selection signal $S_{SEL2}$. For example, when the selection signal $S_{SEL2}$ is at a first level, the motherboard 110 operates in a first mode. At this time, the control circuit 115 uses the Ethernet network data $D_{ETH}$ as the output data SO and outputs the Ethernet network data $D_{ETH}$ via the network connection port 111. When the selection signal $S_{SEL2}$ is at a second level, the motherboard 110 operates in a second mode. In this mode, the control circuit 115 uses the image data $D_{IM}$ as the output data SO and outputs the image data $D_{IM}$ via the network connection port 111.

In one embodiment, the selection signal $S_{SEL2}$ is provided by a switch SW2. In this case, the user switches the switch SW2 to direct the network connection port 111 to output the image data $D_{IM}$ or the Ethernet network data $D_{ETH}$. In one embodiment, the switch SW2 is disposed outside of the case for users to switch. In other embodiments, the selection signals $S_{SEL1}$ and $S_{SEL2}$ are provided by a basic input/output system (BIOS). In this case, the user selects the options of the BIOS to select the source of the image data $D_{IM}$ and the source of the output data SO. The BIOS generates the selection signal $S_{SEL1}$ and $S_{SEL2}$ according to the selected option. In one embodiment, the motherboard 110 further comprises a network chip 116. The network chip 116 is configured to generate the Ethernet network data $D_{ETH}$.

Figure 2:
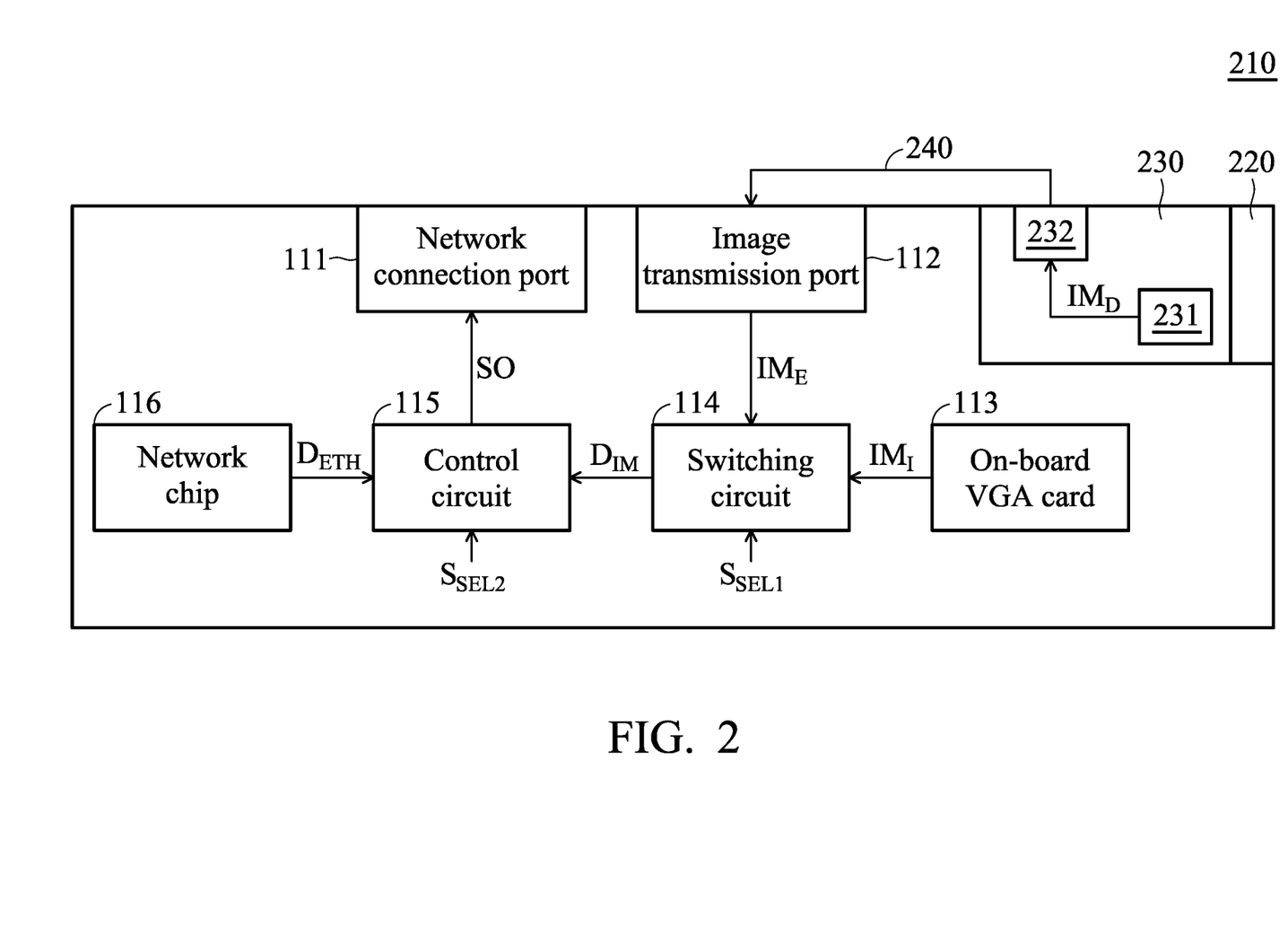
FIG. 2 is a schematic diagram of an exemplary embodiment of a motherboard, according to various aspects of the present disclosure.

FIG. 2 is a schematic diagram of another exemplary embodiment of the motherboard, according to various aspects of the present disclosure. FIG. 2 is similar to FIG. 1 exception that the motherboard 210 of FIG. 2 further comprises a slot 220. The slot 220 is configured to accommodate a VGA card 230. The VGA card 230 comprises an image processing chip 231 and an image output port 232. The image processing chip 231 is configured to generate an image signal $IM_D$. When a transmission cable 240 is coupled between the image transmission port 112 and the image output port 232, the image transmission port 112 receives the image signal $IM_D$ via the transmission cable 240. In this case, the image transmission port 112 uses the image signal $IM_D$ as the external image signal $IM_E$ and provides the image signal $IM_D$ to the switching circuit 114.

Figure 3:
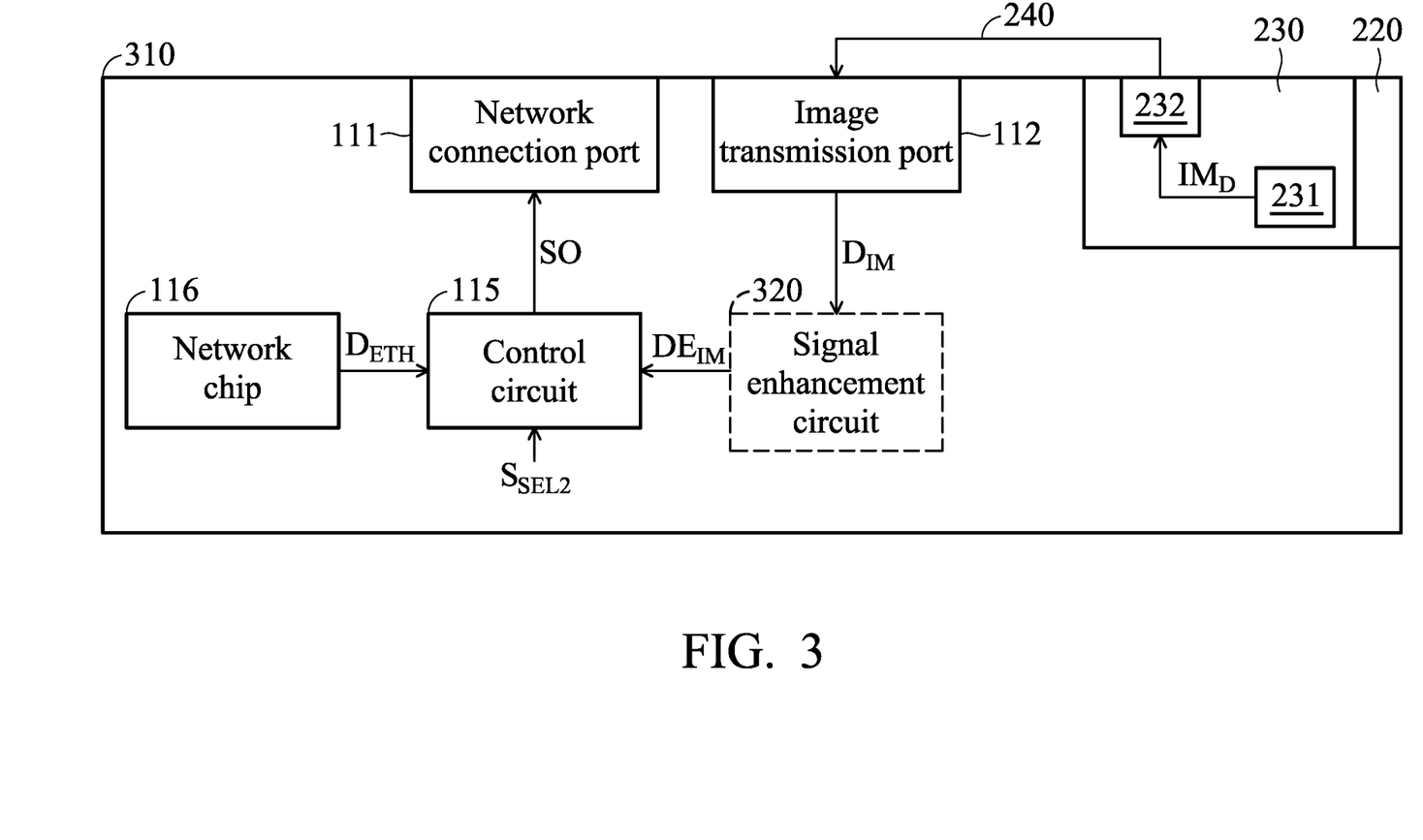
FIG. 3 is a schematic diagram of another exemplary embodiment of a motherboard, according to various aspects of the present disclosure.

FIG. 3 is a schematic diagram of another exemplary embodiment of a motherboard, according to various aspects of the present disclosure. FIG. 3 is similar to FIG. 2 exception that no an on-board VGA card is on the motherboard 310. Since there is a single image source (i.e., the image transmission port 112) on the motherboard 310, no switching circuit is disposed on the motherboard 310. In this case, the image transmission port 112 receives the image signal $IM_D$ via the transmission cable 240, uses the image signal $IM_D$ as the image data $D_{IM}$ and provides the image signal $IM_D$ to the control circuit 115. In other embodiments, when the transmission cable 240 is coupled between an electronic device (not shown) and the image transmission port 112, the image transmission port 112 uses the image signal provided by the electronic device as the image data $D_{IM}$.

In this embodiment, the motherboard 310 further comprises a signal enhancement circuit 320. The signal enhancement circuit 320 is configured to enhance the image data $D_{IM}$ and generates an enhanced data $DE_{IM}$. In this case, the control circuit 115 uses the enhanced data $DE_{IM}$ or the Ethernet network data $D_{ETH}$ as the output data SO according to the selection signal $S_{SEL2}$. The image data $D_{IM}$ has been enhanced. When the output data SO is transmitted to a remote electronic device, even if the distance between the motherboard 310 and the remote electronic device is 50 meters or 100 meters, the motherboard 310 can stably transmit the output data SO and maintain the integrality of the output data SO.

In one embodiment, the signal enhancement circuit 320 is a re-driver or a retime. In other embodiments, the signal enhancement circuit 320 can be applied to FIG. 1 or FIG. 2 to enhance the image data $D_{IM}$.

Figure 4:
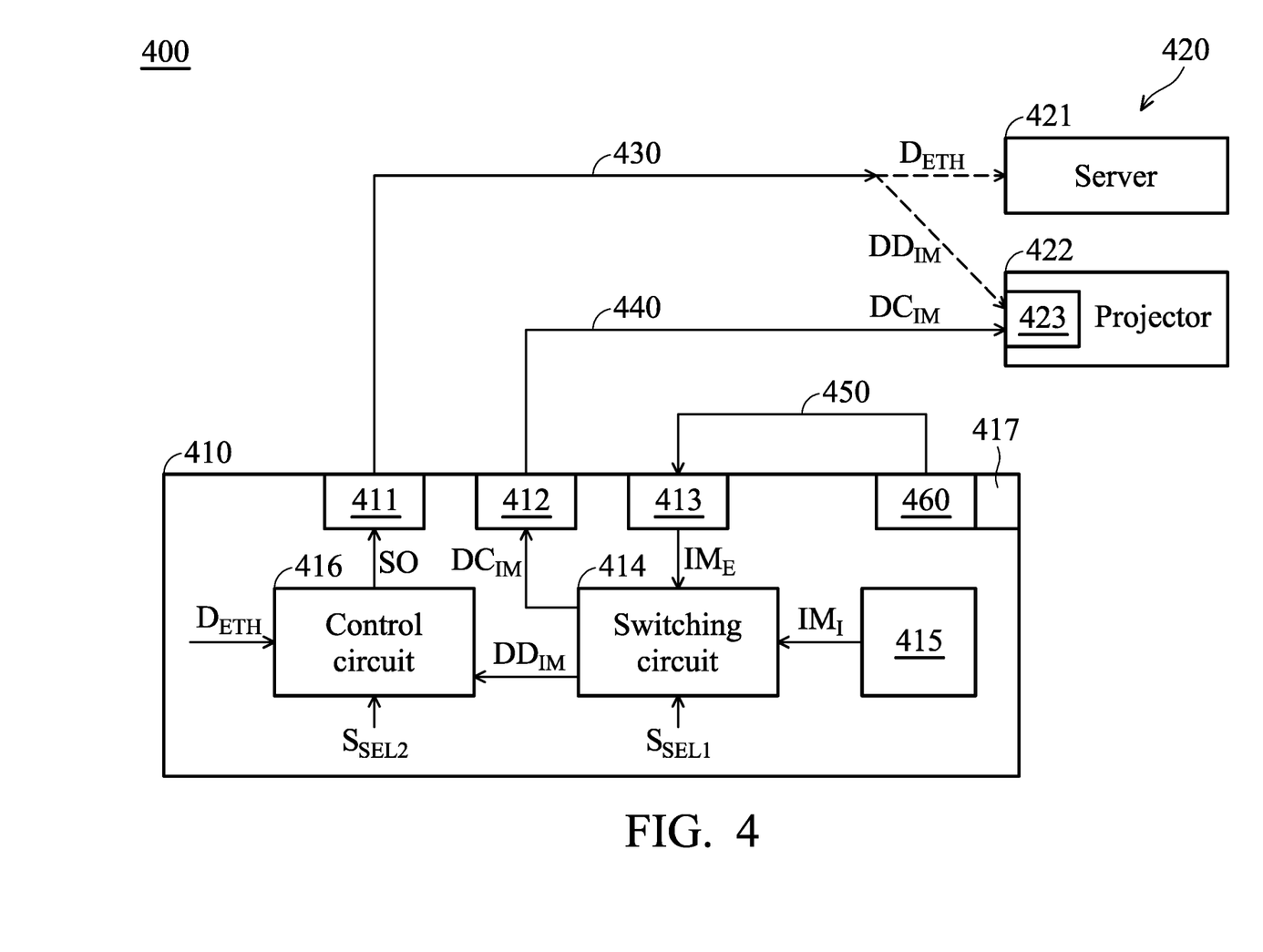
FIG. 4 is a schematic diagram of another exemplary embodiment of the operating system, according to various aspects of the present disclosure.

FIG. 4 is a schematic diagram of another exemplary embodiment of the operating system, according to various aspects of the present disclosure. The operating system 400 comprises a motherboard 410 and an electronic device 420. The motherboard 410 is similar to the motherboard 110 shown in FIG. 1, exception that the motherboard 410 of FIG. 4 comprises two network connection ports 411 and 412.

In this embodiment, at least one of the network connection ports 411 and 412 is a common connection port. The common connection port is capable of outputting network data and the image data. when the motherboard 410 operates in a first mode, the network connection port 411 outputs the Ethernet network data $D_{ETH}$. When the motherboard 410 operates in a second mode, the network connection port 411 outputs the image data $DD_{IM}$. At this time, the network connection port 412 outputs control data $DC_{IM}$. In other embodiments, the motherboard 410 may further comprise a third network connection port (not shown) configured to only output the Ethernet network data $D_{ETH}$. In this case, the third network connection port does not output image data.

In this embodiment, the data format of the Ethernet network data $D_{ETH}$ transmitted by the network connection port 411 is the same as the data format of the image data $DD_{IM}$. In one embodiment, the data formats of the Ethernet network data $D_{ETH}$ and the image data $DD_{IM}$ match a network transmission format. In another embodiment, each of the Ethernet network data $D_{ETH}$ and the image data $DD_{IM}$ comprises four pairs of differential signals.

As shown in FIG. 4, the operating system 400 further comprises network cables 430 and 440. The network cable 430 is coupled between the network connection port 411 and the electronic device 420 to transmit the image data $DD_{IM}$ and the Ethernet network data $D_{ETH}$. The network cable 440 is coupled between the network connection port 412 and the electronic device 420 to transmit the control data $DC_{IM}$.

For example, when the electronic device 420 is a server 421, the motherboard 410 operates in a first operation mode. In this mode, the network connection port 411 outputs the Ethernet network data $D_{ETH}$. Therefore, the server 421 receives the Ethernet network data $D_{ETH}$ via the network cable 430. In anther embodiment, when the electronic device 420 is a projector 422, the network connection port 411 outputs the image data $DD_{IM}$. Therefore, the projector 422 receives the image data $DD_{IM}$ via the network cable 430. At this time, the network connection port 412 outputs the control data $DC_{IM}$. Therefore, the projector 422 receives the control data $DC_{IM}$ via the network cable 440. The projector 422 displays an image according to the image data $DD_{IM}$ and the control data $DC_{IM}$. In this case, the projector 422 has a receiver 423. The receiver 423 transforms the data formats of the image data $DD_{IM}$ and the control data $DC_{IM}$ from a network transmission format into an image transmission format. Then, the projector 422 display an image according to the transformed result of the receiver 423. The receiver 423 may be integrated into the projector. In other embodiments, the receiver 423 is independently disposed outside of the projector 422. In this case, the receiver 423 connects the projector 422 via an image transmission cable (not shown).

In this embodiment, the motherboard 410 further comprises an image transmission port 413, a switching circuit 414, an on-board VGA card 415, a control circuit 416 and a slot 417. The image transmission port 413 is configured to receive an external image signal $IM_E$. In this embodiment, the external image signal $IM_E$ is provided from the VGA card 460. Since the features of the image transmission port 413, the slot 417 and the VGA card 460 are the same as the features of the image transmission port 112, the slot 220 and the VGA card 230 shown FIG. 2, the descriptions of the features of the image transmission port 413, the slot 417 and the VGA card 460 are omitted.

The switching circuit 414 selects the source of the image data according to the selection signal $S_{SEL1}$. In one embodiment, the switching circuit 414 selects the external image signal $IM_E$ according to the selection signal $S_{SEL1}$. In this case, the switching circuit 414 uses the differential component of the external image signal $IM_E$ as the image data $DD_{IM}$ and provides the image data $DD_{IM}$ to the control circuit 416. Furthermore, the switching circuit 414 uses the control component of the external image signal $IM_E$ as the control data $DC_{IM}$ and provides the control data $DC_{IM}$ to the network connection port 412. In another embodiment, the switching circuit 414 selects the internal image signal $IM_I$ according to the selection signal $S_{SEL1}$. In this case, the switching circuit 414 uses the differential component of the internal image signal $IM_I$ as the image data $DD_{IM}$ and provides the image data $DD_{IM}$ to the control circuit 416. Additionally, the switching circuit 414 uses the control component of the internal image signal $IM_I$ as the control data $DC_{IM}$ and provides the control data $DC_{IM}$ to the network connection port 412.

Assume that each of the internal image signal $IM_I$ and the external image signal $IM_E$ is a HDMI image signal. The HDMI image signal has differential components, such as DATA0+/−, DATA1+/−, DATA2+/− and CLK+/− and control components, such as CED/DDC, SLC/SDA, +5V, and Hot Plug. In this case, the switching circuit 414 uses the differential components DATA0+/−, DATA1+/−, DATA2+/− and CLK+/− as the image data $DD_{IM}$ and uses the control components CED/DDC, SLC/SDA, +5V, and Hot Plug as the control data $DC_{IM}$.

In other embodiments, the control data $DC_{IM}$ is provided by the control circuit 416. In this case, the control data $DC_{IM}$ is pre-stored in the control circuit 416. When the user directs the network connection port 411 to output the image data $DD_{IM}$, the control circuit 416 outputs the predetermined control data $DC_{IM}$ to the network connection port 412.

In some embodiments, the control circuit 416 outputs the predetermined control data $DC_{IM}$ to the image transmission port 413 or the on-board VGA card 415 to set the control component of the external image signal $IM_E$ or the internal image signal $IM_I$. For example, when the switching circuit 414 selects and outputs the external image signal $IM_E$, the control circuit 416 provides the control data $DC_{IM}$ to the image transmission port 413. In this case, the image transmission port 413 provides the control data $DC_{IM}$ to the VGA card 460 via the transmission cable 450. The VGA card 460 adjusts the external image signal $IM_E$ according to the control data $DC_{11\backslash4}$. In another embodiment, when the switching circuit 414 selects and outputs the internal image signal $IM_I$, the control circuit 416 provides the control data $DC_{IM}$ to the on-board VGA card 415. In this case, the on-board VGA card 415 may adjust the internal image signal $IM_I$ according to the control data $DC_{11\backslash4}$. In other embodiments, the signal enhancement circuit 320 can be applied in FIG. 4. In such cases, the signal enhancement circuit 320 is configured to amplify the image data $DD_{IM}$ and then provides the amplified result to the control circuit 416.

Figure 5:
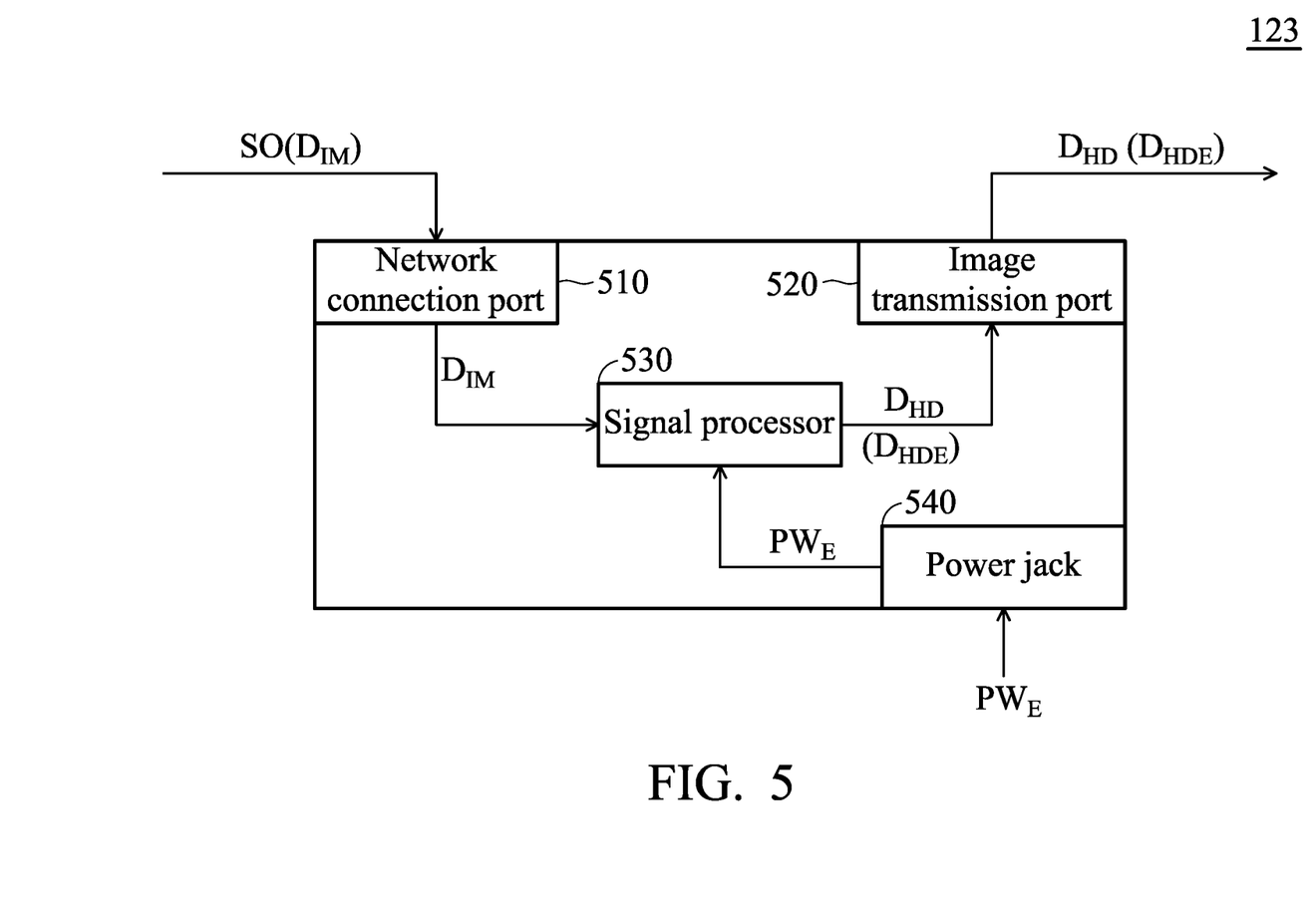
FIG. 5 is a schematic diagram of an exemplary embodiment of a receiver, according to various aspects of the present disclosure.

FIG. 5 is a schematic diagram of an exemplary embodiment of the receiver 123, according to various aspects of the present disclosure. As shown in FIG. 5, the receiver 123 comprises a network connection port 510, an image transmission port 520, and a signal processor 530. The network connection port 510 is configured to receive the output data SO from the motherboard. In this embodiment, the output data SO is the image data $D_{IM}$. The signal processor 530 transforms the format of the image data $D_{IM}$ from a network transmission format into an image transmission format and generate image data $D_{HD}$. In this embodiment, the image data $D_{HD}$ matches the HDMI standard. The image transmission port 520 is configured to transmits the image data $D_{HD}$.

In this embodiment, the signal processor 530 comprises a signal enhancement circuit (not shown) to enhance the image data $D_{HD}$ and generate enhanced data $D_{HDE}$. In this case, the image transmission port 520 outputs the enhanced data $D_{HDE}$. In one embodiment, the signal enhancement circuit is a re-driver or a retime.

In other embodiments, the receiver 123 further comprises a power jack 540. The power jack 540 is configured to receive an external power $PW_E$ and provides the external power $PW_E$ to the signal processor 530. In one embodiment, the external power $PW_E$ is a DC power.

Figure 6:
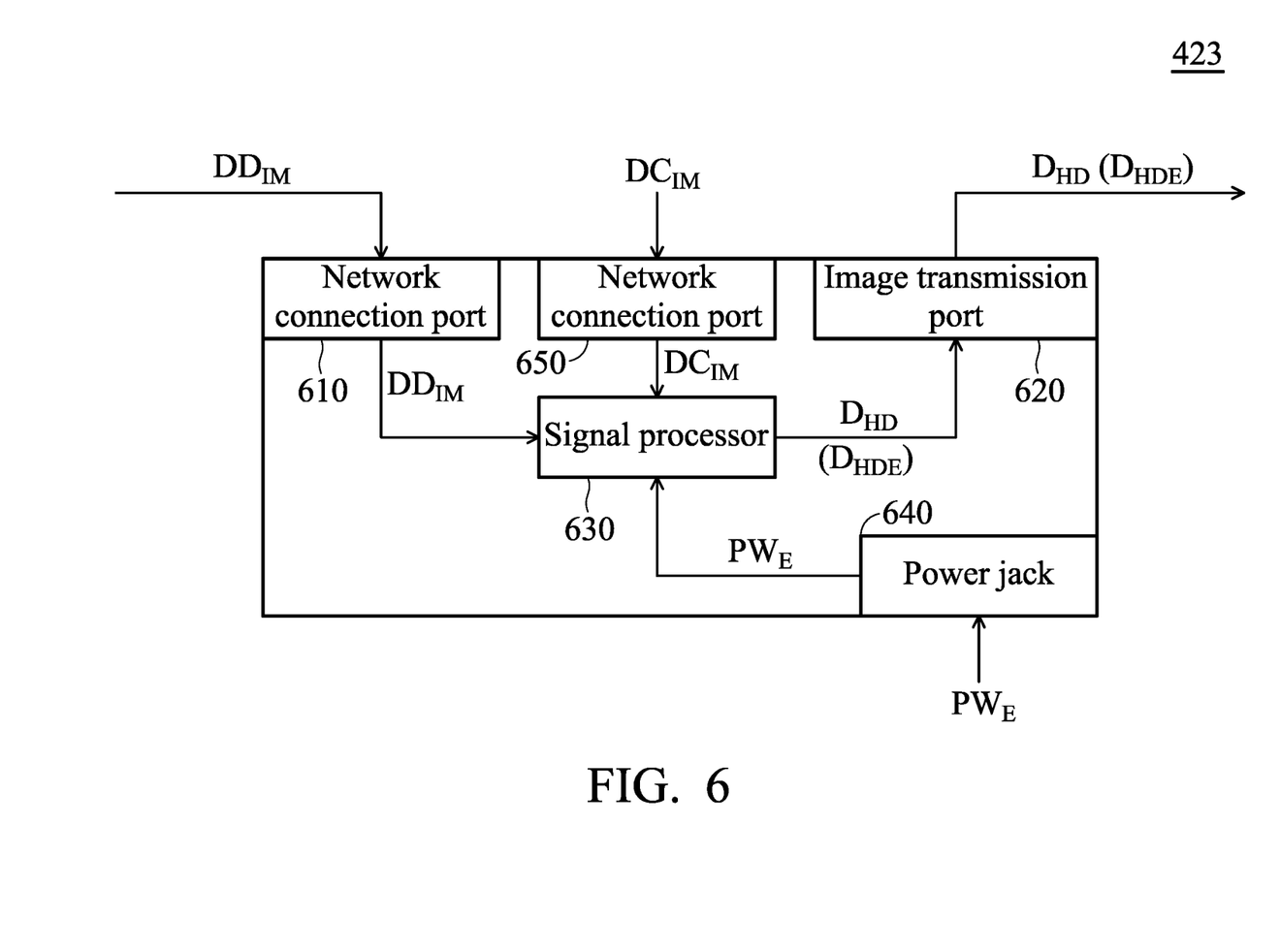
FIG. 6 is a schematic diagram of another exemplary embodiment of the receiver, according to various aspects of the present disclosure.

FIG. 6 is a schematic diagram of another exemplary embodiment of the receiver 423, according to various aspects of the present disclosure. The receiver 423 comprises network connection ports 610, 650, an image transmission port 620, a signal processor 630 and a power jack 640. The network connection port 610 receives the image data $DD_{IM}$. The network connection port 650 receives the control data $DC_{IM}$. The signal processor 630 processes the image data $DD_{IM}$ and the control data $DC_{IM}$ to generate the image data $D_{HD}$ that matches the HDMI standard. The image transmission port 620 is configured to output the image data $D_{HD}$. In other embodiments, the signal processor 630 comprises a signal enhancement circuit (not shown). The signal enhancement circuit is configured to enhance the image data $D_{HD}$ to generate the enhanced data $D_{HDE}$. In this case, the image transmission port 620 outputs the enhanced data $D_{HDE}$.

In other embodiments, the receiver 423 further comprises a power jack 640. The power jack 640 is configured to receive external power $PW_E$ and provides the external power $PW_E$ to the signal processor 630. In one embodiment, the external power $PW_E$ is a DC power, but the disclosure is not limited thereto. In some embodiments, the external power $PW_E$ is an AC power. In this case, the signal processor 630 may comprise a power converter (not shown). The power converter is configured to convert the AC power into a DC power. The power converter may provide the DC power to other elements of the signal processor 630.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A motherboard capable of outputting image data and disposed in a case, comprising:
   a basic input/output system (BIOS);
   an image transmission port configured to receive an external image signal;
   an on-board video graphics array (VGA) card configured to provide an internal image signal;
   a switching circuit selectively using the external image signal or the internal image signal as the image data according to a selection signal;
   a control circuit selectively using the image data or Ethernet network data as output data; and
   a first network connection port configured to transmit the output data via a network cable,
   wherein:
   the network cable is directly connected between the first network connection port and an electronic device, in response to the control circuit using the image data as the output data, the electronic device displays an image according to the output data, the selection signal is provided by a switch or the BIOS, and the switch is disposed outside of the case.

2. The motherboard as claimed in claim 1, wherein the switching circuit uses a differential component of the external image data or a differential component of the internal image data as the image data.

3. The motherboard as claimed in claim 2, further comprising:
a second network connection port configured to transmit control data,
wherein the switching circuit uses a control component of the external image signal or a control component of the internal image signal as the control data.

4. The motherboard as claimed in claim 2, wherein the control circuit sets a control component of the external image signal or a control component of the internal image signal.

5. The motherboard as claimed in claim 1, wherein the image transmission port is a high-definition multimedia interface (HDMI) port or a digital visual interface (DVI) port.

6. The motherboard as claimed in claim 1, further comprising:
a slot configured to accommodate a VGA card,
wherein the VGA card comprises an image processing chip and an image output port, and the image processing chip is configured to generate an image signal,
wherein in response to a transmission cable being coupled between the image transmission port and the image output port, the image signal serves as the external image signal.

7. The motherboard as claimed in claim 1, further comprising:
a signal enhancement circuit configured to enhance the image data and generate enhanced data,
wherein the control circuit uses the enhanced data as the output data.

8. A motherboard capable of outputting image data and disposed in a case, comprising:
a basic input/output system (BIOS);
an image transmission port configured to receive an external image signal;
a control circuit selectively using the external image signal or an Ethernet network signal as an output signal according to a selection signal; and
a first network connection port configured to transmit the output signal via a network cable,
wherein:
the network cable is directly connected between the first network connection port and an electronic device,
in response to the control circuit using the external image signal as the output signal, the electronic device displays an image according to the output signal,
the selection signal is provided by a switch or the BIOS, and the switch is disposed outside of the case.

9. The motherboard as claimed in claim 8, wherein the image transmission port is a high-definition multimedia interface (HDMI) port or a digital visual interface (DVI) port.

10. The motherboard as claimed in claim 8, further comprising:
a slot configured to accommodate a VGA card,
wherein the VGA card comprises an image processing chip and an image output port, and the image processing chip is configured to generate an image signal,
wherein in response to a transmission cable being coupled between the image transmission port and the image output port, the image signal serves as the external image signal.

11. The motherboard as claimed in claim 8, further comprising:
a signal enhancement circuit configured to enhance the image data and generate enhanced data,
wherein the control circuit uses the enhanced data as the output data.

12. The motherboard as claimed in claim 8, wherein the control circuit uses a differential component of the external image signal as the image data.

13. The motherboard as claimed in claim 12, further comprising:
a second network connection port configured to transmit control data,
wherein the control circuit uses a control component of the external image signal as the control data.

14. The motherboard as claimed in claim 12, wherein the control circuit sets a control component of the external image signal.

15. An operating system comprising:
a motherboard as claimed in claim 1;
a receiver directly connected to the network cable to directly receive the output data and comprising:
a network connection port directly connected to the network cable to receive the output data;
a signal processor enhancing the output data to generate enhanced data; and
an image transmission port configured to output the enhanced data; and
a display device coupled to the image transmission port to receive the enhanced data and display the image according to the enhanced data, wherein the electronic device comprises the receiver and the display device.

16. The operating system as claimed in claim 15, wherein the receiver is integrated into the display device.

17. The operating system as claimed in claim 15, further comprising:
a power jack configured to receive external power and supply power to the signal processor.

18. An operating system comprising:
a motherboard as claimed in claim 8;
a receiver directly connected to the network cable to directly receive the output data and comprising:
an input port configured to receive the output data;
a signal processor enhancing the output data to generate enhanced data; and
an output port configured to output the enhanced data; and
a display device coupled to the output port to receive the enhanced data and display the image according to the enhanced data, wherein the electronic device comprises the receiver and the display device.

19. The operating system as claimed in claim 18, wherein the receiver is integrated into the display device.

20. The operating system as claimed in claim 18, further comprising:
a power jack configured to receive external power and supply power to the signal processor.

* * * * *